United States Patent [19]

Roberts

[11] Patent Number: 4,823,856
[45] Date of Patent: Apr. 25, 1989

[54] SERRATED OUTLINE MARKING FOR A TIRE SIDE WALL

[75] Inventor: Charles W. Roberts, Akron, Ohio

[73] Assignee: The Goodyear Tire & Rubber Company, Akron, Ohio

[21] Appl. No.: 891,053

[22] Filed: Jul. 31, 1986

Related U.S. Application Data

[63] Continuation of Ser. No. 683,824, Dec. 19, 1984, abandoned.

[51] Int. Cl.⁴ .............................................. B60C 13/02
[52] U.S. Cl. .................................................... 152/523
[58] Field of Search ....... 152/523, 524, 525, DIG. 12; 40/587; 428/913.3, 187; D12/152

[56] References Cited

U.S. PATENT DOCUMENTS

| | | |
|---|---|---|
| D. 128,632 | 8/1941 | Lee . |
| D. 171,451 | 2/1954 | Kraft . |
| D. 204,861 | 5/1966 | Blankenship et al. . |
| D. 206,847 | 1/1967 | Makris . |
| D. 206,986 | 2/1967 | Makris . |
| D. 206,987 | 2/1967 | Makris . |
| 1,635,077 | 2/1927 | Erskine . |
| 2,082,928 | 6/1937 | Wilhelmy . |
| 2,109,000 | 2/1938 | Waldo . |
| 2,388,880 | 11/1945 | Stitt .................................. 428/187 X |
| 2,482,094 | 9/1949 | Chavannes et al. ............ 428/187 X |
| 2,807,564 | 9/1957 | Mitchell . |
| 3,518,335 | 6/1970 | Jablonsky . |
| 4,198,774 | 4/1980 | Roberts et al. .................. 152/353 R |

FOREIGN PATENT DOCUMENTS

| | | |
|---|---|---|
| 138775 | 2/1920 | United Kingdom . |
| 330432 | 6/1930 | United Kingdom . |
| 2010755 | 7/1979 | United Kingdom . |

Primary Examiner—Michael W. Ball
Assistant Examiner—Ramon R. Hoch
Attorney, Agent, or Firm—T. P. Lewandowski

[57] ABSTRACT

A rubber article (A) has a design (12) outlined by a serrated portion including a plurality of ribs (22) which are separated by grooves (20). The ribs and grooves are located in a surface (10) of the article (A) and the design (12) is defined by a substantially flat ungrooved portion of the article surface. The ribs (22) extend no further outwardly than the article surface (10).

23 Claims, 1 Drawing Sheet

U.S. Patent     Apr. 25, 1989     4,823,856
FIG.1
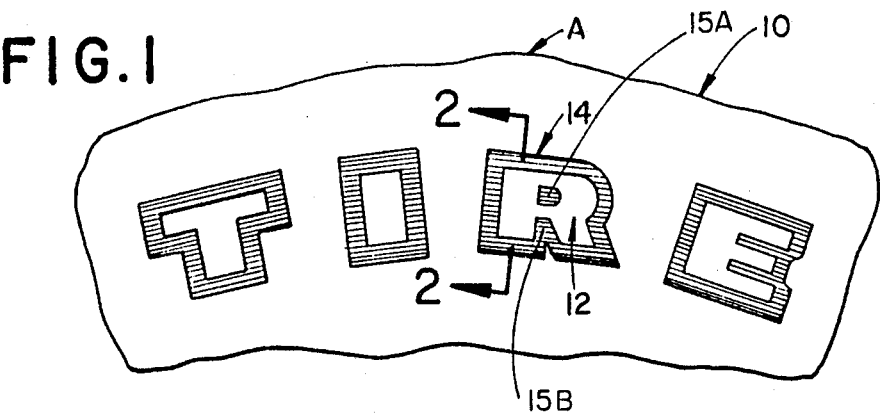
FIG.2
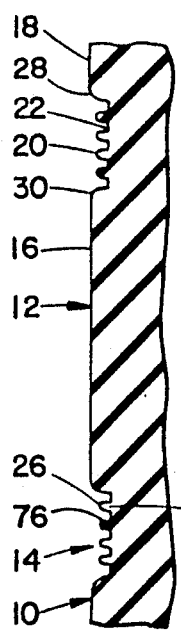
FIG.3 (PRIOR ART)
FIG.4
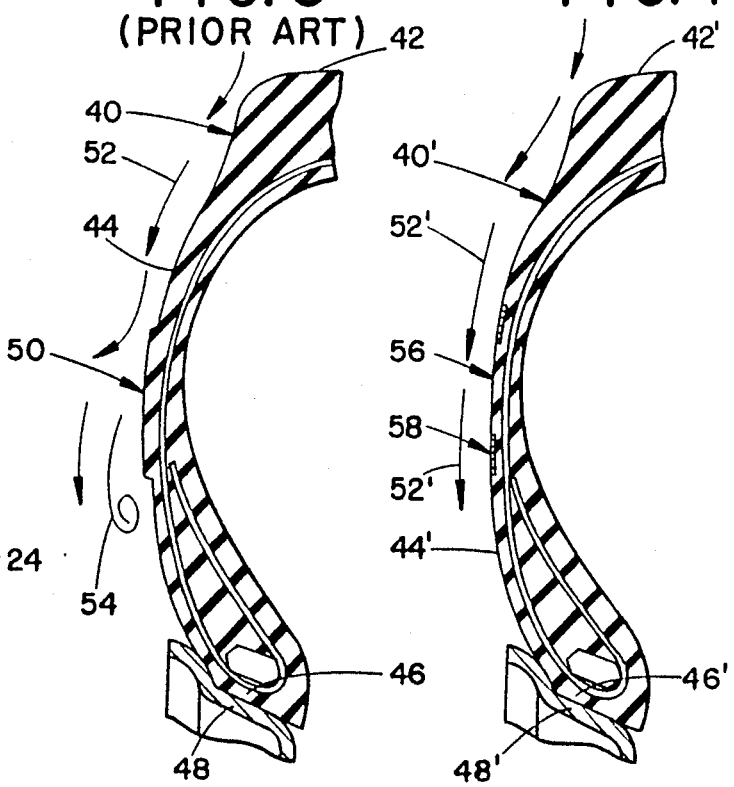
FIG.5A 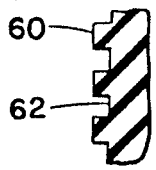   FIG.5B 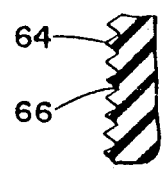   FIG.5C 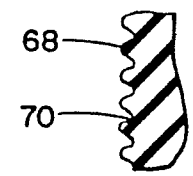   FIG.5D 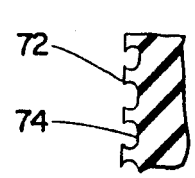

SERRATED OUTLINE MARKING FOR A TIRE SIDE WALL

This is a continuation of co-pending application Ser. No. 683,824, filed on Dec. 19, 1984, now abandoned.

This invention generally pertains to markings or indicia for molded articles. More specifically, the present invention relates to a marking which is outlined by a serrated surface portion of a molded article.

The invention is particularly applicable to the sidewalls of rubber tires and will be described with particular reference thereto. However, it will be appreciated by those skilled in the art that the invention had broader applications and may also be adapted for use in many other environments, e.g. serrated outline markings or designs used in rubber mats, belts, hoses or various molded plastic objects, such as containers, and the like.

Manufacturers have for many years placed indicia, that is, markings such as numerals, letters, characters, symbols, or other designations, upon the sidewalls of their tires to enhance the appearance and marketability of their products. Such markings are normally molded in relief on the sidewalls of a tire at the time of the finish molding thereof in a vulcanizing mold. The sidewall markings usually comprise letters or numbers located at a relatively short height above the tire sidewall surface. This is done to heighten the visibility of the markings so that they contrast with the remainder of the tire snowball. However, the owner must be careful not to scrape or abrade the tire sidewall region because the markings are then no longer distinct and become difficult or impossible to read.

Markings or indicia which extend above the tire sidewall surface are disadvantageous, however, because they increase the air drag on the tire as it moves forwardly over a ground surface. Such increased air drag is due to the fact that the raised markings disturb the laminar air flow around the sidewall of the tire and cause a turbulent air flow to occur.

Also, raised tire markings necessitate the use of somewhat more tire material to construct the tire.

Accordingly, it has been considered desirable to develop new and improved markings, especially for tire sidewalls, which would overcome the foregoing difficulties and others while providing better and more advantageous overall results.

In accordance with the present invention, a new and improved serrated outline marking is provided for a molded article.

More particularly in accordance with the invention, the marking comprises a serrated portion which includes a plurality of ribs separated by grooves. The ribs and grooves are located in a surface of the article. A design is surrounded by the ribs and grooves, with the design being defined by a substantially flat ungrooved portion of the article surface. The ribs of the serrated portion extend no further outwardly than the article surface.

In accordance with another aspect of the invention, a marking for a sidewall of a tire comprises a serrated outline portion including a plurality of ribs separated by grooves. The ribs and grooves are located on a surface of the the tire sidewall. A design is outlined by the ribs and grooves with the design being defined by a substantially flat ungrooved portion of the tire sidewall surface. The grooves are located inwardly of the sidewall surface and the ribs extend no further outwardly than the tire sidewall surface.

In accordance with still another aspect of the invention, an indicium for a rubber article comprises an article having a surface and a substantially flat ungrooved indicium portion located at the same level as the surface of the article. A recessed serrated portion outlines the indicium portion. The serrated portion includes a plurality of ribs separated by grooves with the ribs and grooves being located in the article surface. The ribs are integral with the article and extend no further outwardly than the article surface.

An advantage of the present invention is the provision of a novel marking or indicium for a molded article in which a substantially flat design located at a surface of the article is outlined by a serrated portion including a plurality of ribs separated by grooves.

Another advantage of the invention is the provision of such a design in a tire sidewall to reduce air turbulence and hence wind drag on the tire as the tire rotates.

Still another advantage of the invention is the provision of such a design located at the height of the tire sidewall to reduce the amount of rubber necessary to mold the tire as compared to previous designs in which raised lettering and the like extended above the tire sidewall surface.

Yet other benefits and advantages of the invention will become apparent to those skilled in the art upon a reading and understanding of the following detailed specification.

The invention may take physical form in certain parts and arrangements of parts, preferred and alternate embodiments of which will be described in detail in this specification and illustrated in the accompanying drawings which form a part hereof, and wherein:

FIG. 1 is a plan view of a marking according to the present invention;

FIG. 2 is an enlarged cross-sectional view along line 2—2 of the marking of FIG. 1;

FIG. 3 is a cross-sectional view through part of a prior art tire;

FIG. 4 is a cross-sectional view through part of a tire having a marking according to the present invention; and, FIGS. 5A–5D are greatly enlarged cross-sectional views of various alternate embodiments of serrated outline portions which can be used in the marking of FIG. 2.

Referring now to the drawings, wherein the showings are for purposes of illustrating preferred and alternate embodiments of the invention only and not for purposes of limiting same, FIG. 1 shows the subject new marking or indicium in a molded article A. While the marking is primarily intended for use, and will hereinafter be described in connection with a tire sidewall, it will be appreciated that the overall concept involved could be adapted for use in other environments as well.

More particularly, the article A may be the sidewall 10 of a rubber (either natural or synthetic) tire with the marking or design including a number of letters 12 each of which is outlined by a serrated portion 14 in the sidewall. With reference now to the letter "R" in FIG. 1, it can be seen that the serrated portion or border portion 14 includes a margin area and two "counter" areas 15A, 15B ("counter" being defined in the typesetting art as a depression between raised lines of a typeface indicium). Counter area 15A is completely surrounded by the lines defining the letter "R" while counter area 15B is only partially surrounded and is otherwise open to the margin area. With reference now to FIG. 2, the letter portion 12 has a substantially flat and ungrooved surface 16 which is at the same height as a surface 18 of the sidewall 10.

The serrated portion 14 outlining each letter 12 includes a series of projections or ridges or ribs 20 separated by generally U-shaped grooves 22. Preferably, the ridges or ribs 20 are straight and parallel to each other as is illustrated in FIG. 1. Each ridge includes a base portion 24 integral with the sidewall 10 and at the same depth as the bottom of the groove 22 as well as a tip 26 which extends no further outwardly than the surface 18 on the tire sidewall 10 and the letter surface 16.

In a preferred embodiment of the invention, the ridge tips 26 do not extend outwardly as far as the design, i.e. the letter surface 16. Preferably, the ridges are widely spaced from each other by the generally U-shaped grooves 22. An outer border 28 of the serrated outline portion 14 has rounded corners whereas an inner border 30 adjacent to the letters 12 has a much sharper corners to clearly define each of the letters.

The marking is very distinct and highly visible on an article and provides a visually pleasing effect. Such markings on a tire sidewall are advantageous for the tire manufacturer in terms of brand recognition as well. In the case of tires, there are further advantages to the marking as noted hereinbelow.

With reference now to FIG. 3, a conventional inflated rubber tire (typical of the prior art) has a tire body 40 including a tread portion 42, a sidewall 44 and a bead portion 46 which is retained in a rim 48 (the other sidewall of the tire is not illustrated). The section of the tire illustrated in FIG. 3 is a cross section taken through the forward portion which will rotate counterclockwise to contact the ground surface. The conventional tire also has raised lettering 50 which extends past the surface of the tire sidewall 44. As the tire moves forward, the air stream flowing past the tire is fairly laminar along the leading portion of the sidewall 44 as indicated by arrow 52. But the laminar flow is disturbed when the raised lettering 50 is encountered as shown by the whorl 54.

On the other hand, and with reference now to the present invention as embodied in the tire of FIG. 4, it is seen that the flow remains more laminar past the markings or indica. For ease of illustration and appreciation of FIG. 4, like components are identified by like numerals with a primed suffix (').

In this FIGURE, a tire body 40' according to the present invention is similarly provided with a tread portion 42', a sidewall 44' and a bead 46' held in a rim 48'. However, in the case of FIG. 4, the marking or lettering 56 is at the same height as the rest of the tire sidewall 44' in the same way that the lettering 12 was at the same height as the sidewall 10 in FIGS. 1 and 2. For this reason, the flow along the sidewall, illustrated by arrow 52', remains more laminar past the tire lettering 56 thus reducing the amount of wind drag due to air turbulence along the sidewall as the tire rotates. As a result, a vehicle engine will need to expend less power to rotate the tire.

The structural stress on a tire, due to a change in the tire's cross-sectional width, may also be reduced somewhat since the markings or indicia 56 are at the same height as the rest of the tire sidewall 44'.

Moreover, the amount of rubber necessary to mold the tire is also reduced somewhat since extra rubber material is not necessary for the molding of raised lettering on the tire.

Although the markings or indicia according to the present invention are preferably formed by molding and vulcanizing the tire carcass, they may also be formed by cutting, abrading, grinding or combinations thereof. The surfaces 16 of the letters 12, as well as the inner and outer borders 30, 28 on the serrated portions 14 around the letters may be buffed or ground after vulcanization. Where only a limited number of articles having markings according to the invention are to be manufactured, cutting and or grinding operations may be preferable to the provision of molds for the markings.

In one preferred embodiment of the invention, and with reference again to FIG. 2, the ridges 20 are 0.5 of an inch or 12.2 millimeters in height whereas the depth of the grooves 22 are 0.76 of an inch or 19.3 millimeters thus illustrating that the ridge tips 26 do not extend to the height of the letter surface 16. The ridges may be separated by grooves of a width of 0.6 of an inch or 15.2 millimeters with each of the ridge tips 26 being separated by 1.0 inch or 25.4 millimeters.

Approximately four ridges 20 and five grooves 22 may be provided along any one edge of each of the letters 12 to outline that letter as shown in FIG. 2, although it should be recognized that any larger or smaller number could also be used as desired. As mentioned, the serrated outline portion's inner border 30 is fairly sharp and there is only preferably a 1.1° inclination to the perpendicular along that border. On the other hand, the outer border 28 is much more curved as is evident in FIG. 2.

With reference now to FIGS. 5A–5D, alternate embodiments of the types of ridges or ribs and the corresponding grooves which may be used in the serrated outline portion 14 are illustrated. In this connection, square ridges or ribs 60, and square grooves 62 are illustrated in FIG. 5A. Triangular ribs 64, and V-shaped grooves 66 are illustrated in FIG. 5B. Teardrop-shaped ribs 68, and narrow U-shaped grooves 70 are illustrated in FIG. 5C. FIG. 5D illustrates trapezoidal ribs 72 and wide U-shaped grooves 74.

Preferably, however, as illustrated in FIG. 2, the ridges or ribs 20 have a blunted V-shape with facets or side walls 76 which may lie in the range of 10° to 80° from the normal to the tire surface whereby the contrast between the facets and the remainder of the tire provides a readily perceivable pattern. These facets or side walls may each be plane surfaces as illustrated in FIGS. 5A and 5B or one or more of the facets may be curved in cross section as illustrated in FIGS. 5C and 5D. Of course, the radius of curvature of the facets may vary across the width of the facet and the facet may be convex or concave with respect to the outside surface of the tire.

The grooves 22 between each of the ridges or ribs 20 may be straight or curved and adjacent grooves may have different shapes or curvatures depending on the pattern required. The grooves 22 may also aid somewhat in cooling the tire since the tire surface area is increased. Improved cooling of the tire is a useful advantage particularly in high-speed tires. Such cooling is also useful in tires that are adapted to run in a deflated condition since when deflated, substantial amounts of heat are generated in the tire sidewalls due to deflection of same as the tire rotates.

The subject invention thus provides a molded article marking or incidium having a novel structure and providing a visually pleasing effect. The marking is particularly useful in tire sidewalls as a new way of identifying the tire and increasing its marketability. The invention is also advantageous in that it reduces wind drag as the tire rotates and may reduce structural stress variations across the tire profile. The amount of rubber necessary to mold a tire is also reduced somewhat.

The invention has been described with reference to preferred and alternate embodiments. Obviously, modifications and alterations will occur to others upon the reading and understanding of this specification. It is intended to include all such alterations and modifications insofar as they come within the scope of the appended claims or the equivalents thereof.

Having thus described the invention, it is now claimed:

1. A tire sidewall marking comprising:
   a serrated margin area including a plurality of ribs separated by grooves, said ribs and grooves being located in a surface of a tire article;
   an indicium integral with said article and completely surrounded by said margin area ribs and grooves, wherein said indicium is defined by a substantially flat ungrooved portion of said article surface, said indicium and said margin area being completely surrounded by a substantially flat ungrooved portion of said article surface; and,
   at least one counter area at least partially surrounded by said indicium, said counter area being serrated and being defined by ribs and grooves, said counter area grooves being located in said article surface.

2. The marking of claim 1 wherein a base of each rib in said margin area and said counter area lies inwardly of said article surface and an apex of each rib does not extend as far outwardly as said article surface.

3. The marking of claim 2 wherein said grooves of said margin area and said counter area are 19.3 millimeters in depth and said ribs in said margin area and said counter area are 12.2 millimeters in height.

4. The marking of claim 1 wherein said ribs in said margin area and said counter area have side walls which are disposed between 10° to 80° in relation to a line perpendicular to said article surface.

5. The marking of claim 1 wherein said ribs in said margin area and said counter area are straight and parallel to each other across both said serrated margin area and said at least one counter area and wherein said ribs extend approximately transversely to a longitudinal centerline of said indicium.

6. The marking of claim 1 wherein said ribs in said margin area and said counter area are substantially triangular in cross section.

7. The marking of claim 1 wherein said ribs in said margin area and said counter area are substantially rectangular in cross section.

8. The marking of claim 1 wherein said ribs in said margin area and said counter area are substantially trapezoidal in cross section.

9. The marking of claim 1 wherein said ribs in said margin area and said counter area are substantially teardrop-shaped in cross section.

10. The marking of claim 1 further comprising an ungrooved portion of said article surface surrounding said serrated margin area.

11. A tire sidewall marking such as letters, numerals, characters, or symbols comprising:
    a serrated border portion including a plurality of ribs separated by grooves, said ribs and grooves being located on a surface of the tire sidewall;
    a substantially flat ungrooved alphanumeric character integral with said tire sidewall surface and completely outlined by said serrated border portion, said character being defined by said tire sidewall surface; and,
    at least one counter area at least partially surrounded by said character, said counter area being serrated and being defined by ribs and grooves.

12. The marking of claim 11 wherein said ribs do not extend outwardly as far as said sidewall surface.

13. The marking of claim 11 wherein said ribs are substantially straight and parallel to each other across said serrated portion.

14. The tire sidewall of claim 11 wherein a plurality of alphanumeric characters are provided, each character being outlined by said serrated border portion and being spaced from each adjacent character by a portion of said tire sidewall.

15. The tire sidewall of claim 11 wherein said counter area is serrated and includes a plurality of ribs and grooves, said counter area grooves being located inwardly of said tire sidewall surface and said counter area ribs extending no further outwardly than said tire sidewall surface.

16. The tire sidewall of claim 15 wherein said margin area and counter area ribs are substantially parallel to each other and extend normal to a longitudinal centerline of said alphanumeric character.

17. The tire sidewall of claim 11 wherein said border portion is of substantially constant width.

18. The tire sidewall of claim 11 wherein said character is integral.

19. An indicium for a tire sidewall comprising:
    a tire article having a sidewall surface which includes a substantially flat ungrooved portion;
    a substantially flat ungrooved integral indicium portion located in said article at the same level as said surface of said article;
    a recessed serrated margin area completely outlining said indicium portion and including a plurality of ribs separated by grooves, said ribs and grooves being located in said surface of said article, wherein both said indicium portion and said serrated margin area are completely surrounded by said substantially flat ungrooved portion of the article surface, and wherein said ribs are integral with said article and extend no further outwardly than said article surface; and,
    at least one counter area at least partially surrounded by said indicium, said counter area being serrated and being defined by ribs and grooves.

20. The indicium of claim 19 wherein said margin area includes at least four ribs between said indicium portion and said article surface around said indicium portion.

21. The indicium of claim 20 wherein said ribs are straight and parallel to each other across said margin area.

22. The indicium of claim 20 wherein a base of each rib lies inwardly of said article surface and an apex of each rib does not extend as far outwardly as said article surface.

23. The indicium of claim 21 wherein said article surface is a sidewall of a tire.

* * * * *